United States Patent
Karlsson et al.

(10) Patent No.: US 10,569,775 B2
(45) Date of Patent: Feb. 25, 2020

(54) ARRANGEMENT AND METHOD FOR A CRUISE CONTROL BRAKE IN A VEHICLE

(71) Applicant: VOLVO TRUCK CORPORATION, Göteborg (SE)

(72) Inventors: Lars Karlsson, Göteborg (SE); Anders Eriksson, Torslanda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 371 days.

(21) Appl. No.: 15/319,768

(22) PCT Filed: Jun. 27, 2014

(86) PCT No.: PCT/EP2014/001754
§ 371 (c)(1),
(2) Date: Dec. 17, 2016

(87) PCT Pub. No.: WO2015/197092
PCT Pub. Date: Dec. 30, 2015

(65) Prior Publication Data
US 2017/0144663 A1    May 25, 2017

(51) Int. Cl.
*B60W 30/14* (2006.01)
*B60T 8/24* (2006.01)
(Continued)

(52) U.S. Cl.
CPC ........... *B60W 30/146* (2013.01); *B60T 8/245* (2013.01); *B60T 8/3215* (2013.01); *B60W 10/10* (2013.01);
(Continued)

(58) Field of Classification Search
None
See application file for complete search history.

(56) References Cited

U.S. PATENT DOCUMENTS 3,432,654 A * 3/1969 Reich ...................... B61L 3/246
246/187 R
3,832,599 A * 8/1974 Grundy .................... B61L 3/00
361/170
(Continued)

FOREIGN PATENT DOCUMENTS

DE    102008043777 A1    5/2010
JP        59156826        9/1984
(Continued)

OTHER PUBLICATIONS

Japanese Official Action (dated Jul. 12, 2018) for corresponding Japanese App. 2016-575168.
(Continued)

*Primary Examiner* — Shelley Chen
(74) *Attorney, Agent, or Firm* — Venable LLP; Jeffri A. Kaminski

(57) ABSTRACT

A cruise control arrangement is provided with a cruise control speed function and where the cruise control arrangement is provided with a set cruise speed value and a set brake cruise speed value, and where the cruise control brake function is active when the vehicle travels downhill, where the cruise control arrangement is adapted to activate at least one auxiliary brake when the vehicle speed reaches the set brake cruise speed, to apply a service brake of the vehicle in order to reduce the speed of the vehicle to a predefined first speed if the vehicle speed exceeds the set brake cruise speed when the least one auxiliary brake is delivering full brake power, where the predefined first speed is lower than the set brake cruise speed. Undesired acceleration during downhill travel can be avoided when the brake power of the auxiliary brake is not sufficient. Further, a required downshift can be delayed, which will improve the fuel consumption of the vehicle.

26 Claims, 3 Drawing Sheets

(51) Int. Cl.
  *B60T 8/32* (2006.01)
  *B60W 10/10* (2012.01)
  *B60W 10/18* (2012.01)
(52) U.S. Cl.
  CPC .......... *B60W 10/18* (2013.01); *B60W 30/143* (2013.01); *B60T 2201/04* (2013.01); *B60T 2270/10* (2013.01); *B60T 2270/30* (2013.01); *B60W 2520/10* (2013.01)

(56) References Cited

U.S. PATENT DOCUMENTS

| | | | |
|---|---|---|---|
| 6,202,780 | B1 | 3/2001 | Tanaka et al. |
| 9,481,345 | B2 * | 11/2016 | Schneider ............... B60T 7/122 |
| 2006/0079377 | A1 * | 4/2006 | Steen ...................... B60T 7/122 |
| | | | 477/186 |
| 2006/0100768 | A1 | 6/2006 | Lock et al. |
| 2006/0113833 | A1 | 6/2006 | Lingman et al. |
| 2006/0225971 | A1 * | 10/2006 | Jaeger ..................... B60T 17/18 |
| | | | 188/106 P |
| 2006/0279137 | A1 | 12/2006 | Steen et al. |
| 2007/0233351 | A1 * | 10/2007 | Wang ...................... B60T 7/122 |
| | | | 701/70 |
| 2010/0088001 | A1 | 4/2010 | Kato |
| 2012/0271524 | A1 | 10/2012 | Eriksson et al. |
| 2012/0283928 | A1 | 11/2012 | Bjernetun et al. |
| 2014/0309901 | A1 * | 10/2014 | Schneider ............... B60T 7/122 |
| | | | 701/70 |

FOREIGN PATENT DOCUMENTS

| | | |
|---|---|---|
| JP | H06071265 | 4/1994 |
| JP | 08020321 A * | 1/1996 |
| JP | H11048823 | 2/1999 |
| JP | 2003166632 | 6/2003 |
| JP | 2004299593 | 10/2004 |
| JP | 2005076783 | 3/2005 |
| JP | 2005076846 | 3/2005 |
| JP | 2005263098 | 9/2005 |
| JP | 2007083750 | 4/2007 |
| JP | 2007083750 A * | 4/2007 |
| JP | 2010143462 | 7/2010 |
| WO | 2007078230 A1 | 7/2007 |
| WO | 2007139489 A1 | 12/2007 |
| WO | 9640534 A1 | 5/2010 |

OTHER PUBLICATIONS

International Search Report (dated Mar. 10, 2015) for corresponding International App. PCT/EP2014/001754.
Chinese Official Action (dated Sep. 29, 2018) for corresponding Chinese App. 201480080085.7.

* cited by examiner

ARRANGEMENT AND METHOD FOR A CRUISE CONTROL BRAKE IN A VEHICLE

BACKGROUND AND SUMMARY

The present invention relates to an arrangement and a method for a brake cruise control, system of a vehicle. The invention further relates to a computer program adapted to perform such a method in a brake cruise control system when said program is run on a computer, and a computer program product comprising such program code means stored on a computer readable medium. The arrangement is suitable for heavy vehicles of different kinds having an auxiliary brake.

Modern vehicles are often provided with a cruise control system in order to improve the comfort of a driver. Some systems are also provided with a brake cruise control function that will also brake the vehicle if a set brake cruise speed is exceeded. The cruise control system may further be adapted to maintain a set cruise speed by using only the accelerator, or by also using the brakes of the vehicle. This is especially common in heavy vehicles which are equipped with auxiliary brakes, such as engine brakes and retarders. A further function of the cruise control system of the vehicle may be an economy drive setting, in which the regulating parameters of the cruise control system are ruled by economy.

The cruise control system has a regulating range in which the actual speed value is, maintained. For a system using only the accelerator to maintain the speed, an excessive speed of a few percent may be allowed. Typically, the speed may in this case vary between e.g. 69 to 71 km/h when the speed is set to 70 km/h. It may be possible to set the maximal allowed excessive speed value for the vehicle. In this way, the system can allow the vehicle to travel at an excessive speed at certain occasions, e.g. when travelling on a slight descent.

When the brake system is also used to maintain the speed of the vehicle, referred to as a brake cruise control system, a specified excessive speed can also be allowed for a vehicle rolling down a fairly steep downhill slope. An allowed excessive speed may help to preserve energy by using the momentum of the vehicle. The limit for the allowed excessive speed must of course be set to a value that does not endanger other vehicles or that exceeds speed limits. When an excessive speed limit is set, this value will be used as the set brake cruise speed. The driver sets the brake cruise speed to a value that he estimates that the auxiliary brakes of the vehicle can, maintain during a descent. If the auxiliary brakes cannot hold this set brake cruise speed, the driver must interact and brake the vehicle manually.

It is important that the set brake cruise speed is not exceeded when the vehicle travels downhill. The system compares the actual vehicle speed with the set cruise control speed, and applies the auxiliary brake when the actual vehicle speed equals the set brake cruise speed. Depending on the type or types of auxiliary brake/s available on the vehicle, the inclination of the downhill and the weight of the vehicle, the available brake power from the auxiliary brake may or may not be sufficient to hold the vehicle speed at the set brake cruise speed. For a heavy vehicle and/or a steep downhill, the vehicle speed may continue to rise even when the auxiliary brake is delivering full brake power. It is thus possible that the speed of the vehicle reaches a speed that is higher than the set brake cruise speed when the vehicle travels downhill. In some cases, depending e.g. on the inclination of the slope, the weight of the vehicle and the type of auxiliary brake, the reached speed may be higher than allowed. In such a case, the auxiliary brake may not be powerful enough to lower the speed back to the set brake cruise speed. Such a situation is not comfortable for the driver. Normally, the driver will apply the service brakes of the vehicle manually in order to decrease the speed.

Some drivers may apply the service brake forcefully for a short interval, such that the speed is reduced significantly, to e.g. a speed lower than the set brake cruise speed or even lower, and then release the service brake. By lowering the speed, the available brake power of the auxiliary brake may be enough to keep the speed at the set brake cruise speed. Some drivers may however apply the service brake constantly with a small amount, such that the speed of the vehicle is kept at the brake cruise speed. By applying the service brake constantly, the service brake will heat up which will lead to a degradation of the available brake power from the service brakes. Eventually, the service brake will be overheated and will lose all brake power. This situation should be avoided.

One way to avoid such a situation for the driver is to reduce the set brake cruise speed in order to avoid such situations in the future. But with a lower set brake cruise speed, the speed gap between the set cruise control speed and the brake cruise speed is reduced, which in turn increases fuel consumption and reduces the average speed of the vehicle.

It is known to monitor the road conditions in advance by using e.g. a GPS system in connection with a road map, such that the conditions ahead are known. In such a system, it is possible to decide in advance when the auxiliary brake is to be applied, if the speed of the vehicle is to be reduced before reaching the downhill or if the set brake cruise speed is to be modified, in order to lower the initial speed of the vehicle. However, most vehicles are not equipped with such a system.

US 2012/271524 describes a method and cruise control system for controlling a vehicle cruise control, where necessary downshifts can be avoided at certain vehicle driving situations. Based on the current vehicle condition and known road topography of the travelling road, a downshift can be predicted at a coming vehicle position in a coming uphill slope. By adjusting some vehicle parameters, the downshift can be postponed or avoided, for example a downshift from a direct gear which saves fuel.

WO 2007/139489 describes a system for controlling braking of a motor vehicle during downhill driving. When the auxiliary braking device is applied manually, the system calculates whether the auxiliary braking device is able to alone perform said braking action, based on detected vehicle parameters. If not, the system activates the service frictional braking device assist said auxiliary braking device.

US 2006/279137 describes a brake system in which an auxiliary brake is used as a primary brake and where a service brake may be used as a complement, when the brake power of the auxiliary brake is not enough. The system calculates how the vehicle will be driven in advance, such that suitable parameters of the vehicle can be selected.

US 2006/100768 describes a system in which the service brakes of a vehicle can be used as a complement to an auxiliary brake when a predefined setpoint speed is exceeded.

US 2006/113833 describes a system in which a service brake can be used as a complement brake to an auxiliary brake when the braking power of the auxiliary brake is reduced due to a decreased speed of the vehicle.

US 2012/283928 describes a vehicle control system in which the set brake cruise speed is adjusted by a control unit in dependency of different vehicle parameters, in order to take account of the delay in activation of an auxiliary brake and/or for comfort reasons.

These systems may work well in some situations, but there is still room for an improved cruise control system that can improve fuel efficiency and driver comfort.

It is desirable to provide an improved cruise control arrangement for a vehicle, with an improved activation of an auxiliary brake. It is also desirable to provide an improved method for activating an auxiliary brake in a cruise control system of a vehicle.

In a cruise control arrangement for a vehicle, where the cruise control arrangement is provided with a cruise control brake function and where the cruise control arrangement is provided with a set cruise speed value and a set brake cruise speed value, and where the cruise control brake function is active when the vehicle travels downhill, the problem is solved in that the cruise control arrangement is adapted to activate at least one auxiliary brake when the vehicle speed reaches the set brake cruise speed, to apply a service brake of the vehicle in order to reduce the speed of the vehicle to a predefined first speed if the vehicle speed exceeds the set brake cruise speed when the at least one auxiliary brake is delivering full brake power, where the predefined first speed is lower than the set brake cruise speed.

By this first embodiment of the cruise control arrangement, the arrangement will avoid undesired acceleration of the vehicle during downhill travel when the auxiliary brake cannot produce sufficient brake power. By the inventive arrangement, a downshift of the gearbox can be delayed, which can decrease the wear of the service brakes. When the vehicle speed reaches the set brake cruise speed, the auxiliary brake is activated. An auxiliary brake has a response time which is measured from the activation of the auxiliary brake until the auxiliary brake is fully applied and delivers the requested brake power. The response time is dependent on the type of auxiliary brake.

The speed of the vehicle is monitored, and if the speed increases when the auxiliary brake delivers full brake power, i.e. after the response time of the auxiliary brake, the service brake of the vehicle is activated in order to reduce the speed of the vehicle. The speed of the vehicle is reduced to a predefined first speed which is lower than the set brake cruise speed. The auxiliary brake is still delivering full brake power and the brake power of the auxiliary brake is not reduced. The service brake is released at the predefined first speed and the speed will again increase to the set brake cruise speed where the service brakes are once again applied. In this way, the speed of the vehicle can be held in a speed interval close to the set brake cruise speed without having to perform a downshift.

Since the brake power of the auxiliary brake, which is delivering full brake power, is not enough for holding the vehicle speed at the set brake cruise speed, the speed will slowly increase until the speed exceeds the set brake cruise speed. When the vehicle speed exceeds the set brake cruise speed, the service brake is applied in order to once again reduce the speed to the predefined first speed. When the vehicle speed equals the predefined first speed, the service brake is released.

If the speed of the vehicle increases again such that the vehicle speed exceeds the set brake cruise speed, the operation is repeated. It may also be that the inclination of the downhill slope has decreased, such that the brake power of the auxiliary brake is sufficient to hold the vehicle speed at the set brake cruise speed. In such a case the service brake will not be applied. If the speed increases again, the operation with the service brake is repeated.

In an advantageous development of the inventive arrangement, the operation is repeated until a predetermined condition is reached. The predetermined condition may e.g. be dependent on a predetermined number of repetitions, on the time interval between the application of the service brake, on the acceleration of the vehicle, on the remaining distance of the downhill or on the amount that the service brake has been used.

In an advantageous development of the inventive arrangement, downshift of the gearbox is performed when the predetermined condition is reached. As known in the art, with a downshift, the available brake power of an auxiliary brake arranged upstream of the gearbox will increase such that the brake power may be sufficient to hold the vehicle at a lower speed.

In a method for controlling braking of a vehicle having a brake cruise control function when the vehicle is travelling downhill and when the brake cruise control function is active, where the cruise control brake function is provided with a set cruise speed and a set brake cruise speed, the steps of, activating at least one auxiliary brake when the vehicle speed reaches the set brake cruise speed, of determining if the at least one auxiliary brake is delivering full brake power, of determining if the vehicle speed exceeds the set brake cruise speed when the at least one auxiliary brake is delivering full brake power, and of applying a service brake of the vehicle to reduce the speed of the vehicle to a predefined first speed if the vehicle speed exceeds the set brake speed when the at least one auxiliary brake is delivering full brake power, are disclosed.

With the inventive method, an optimized behaviour of the cruise control system of a vehicle can be obtained, in which an undesired acceleration of the vehicle can be avoided during downhill travel when the auxiliary brake cannot produce sufficient brake power. In this way, the fuel efficiency of the vehicle can be increased and the safety can be increased.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of vehicles, but is especially suitable for heavy vehicles such as trucks and busses, having brake cruise control functionality using auxiliary brakes.

Figure 1:
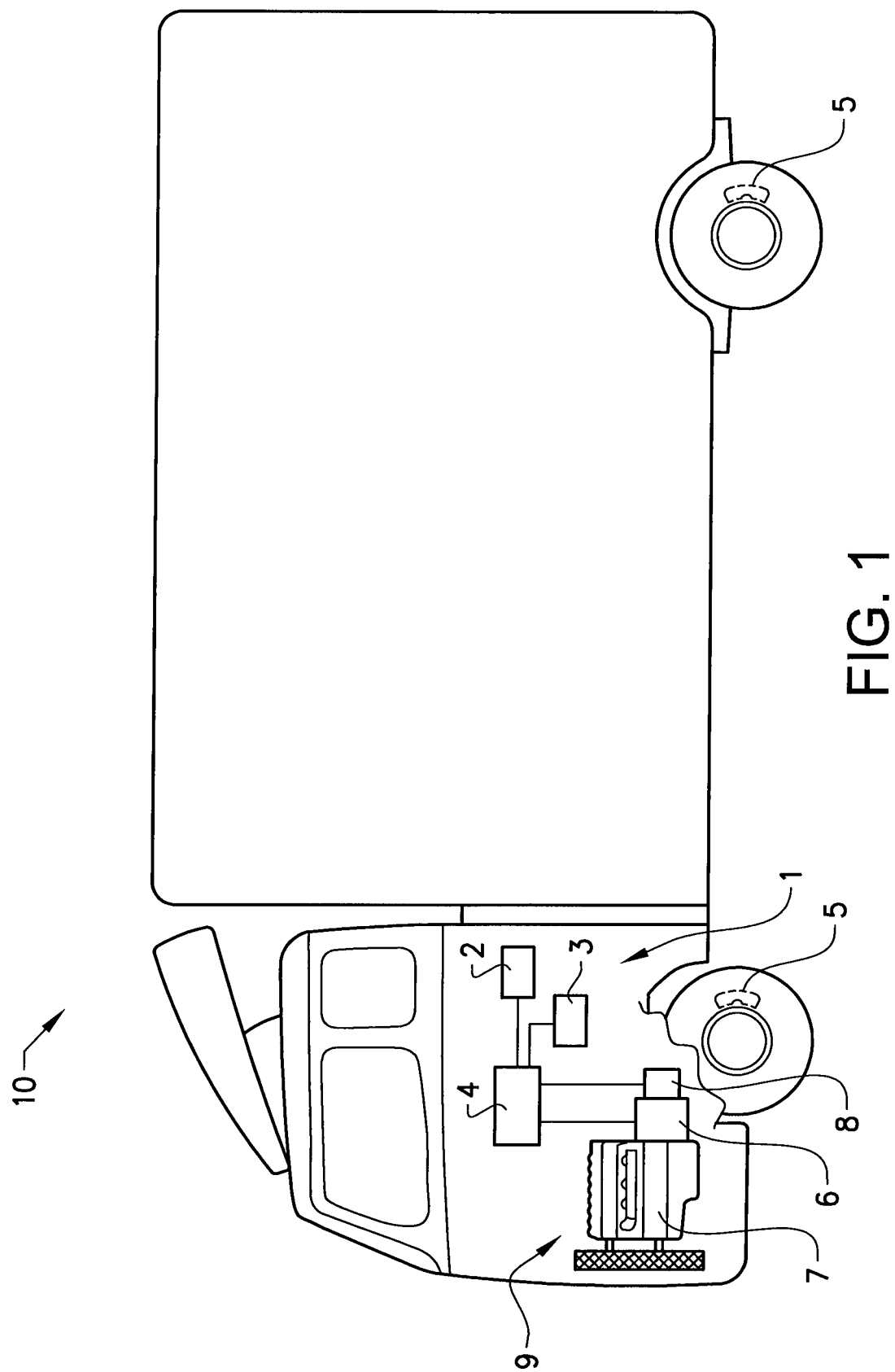
FIG. 1 shows a schematic view of a cruise control arrangement of a vehicle.

FIG. 1 shows a schematic cruise control arrangement of a vehicle. The arrangement 1 comprises a cruise control electronic control unit 4 which may be either a standalone control unit comprising the cruise control system or may be integrated e.g. as a software module in another electronic control unit in the vehicle. The cruise control arrangement further comprises a user interface 2. The user interface comprises buttons used by a driver to input cruise control parameters and to engage and disengage the cruise control system. The user interface may further comprise display means showing part of or all selected cruise control parameters.

In this example, the vehicle 10 is powered by an engine 7 with a gearbox 6, preferably an automated manual transmission or an automatic transmission. The engine is provided with an auxiliary brake 9 which may be a compression release brake or exhaust brake or the like. This auxiliary brake is arranged upstream of the gear box and the delivered brake power will thus be dependent on the engine speed. The transmission is provided with an auxiliary brake in the form of a retarder 8, which may be a hydraulic or electric retarder. This retarder is arranged downstream of the gearbox such that the delivered brake power is dependent on the rotational speed of the propeller shaft. In the description, when an auxiliary brake is referred to, it is to be understood that one or more of the auxiliary brakes can be used. The vehicle is further provided with a service brake 5 which is controlled by a brake control unit 3.

In the arrangement, a cruise speed can be set or selected, which is the reference speed that the vehicle will maintain when the cruise control is engaged. The cruise control system is provided with a preset speed interval around the set cruise speed, e.g. ±1 km/h, in which the cruise speed will be held during cruise control regulation. When the vehicle travels on a substantially even road and the cruise speed is set to 70 km/h, the speed may vary between 69 km/h to 71 km/h.

The driver can also set a brake cruise speed value, which is the speed value that the brake cruise control will maintain when the vehicle is travelling downhill. The brake speed value is normally set as a positive speed offset value that is added to the set cruise speed. If the brake speed offset is set to 4 km/h, the resulting brake cruise speed would in this case be 74 km/h. This speed will be maintained by the auxiliary brakes of the vehicle when the vehicle travels down a descent and where the vehicle will coast faster than the cruise speed. By allowing an excessive speed when travelling downhill, the travel efficiency can be improved. At the same time, the excessive speed should not be allowed to be too high, such that the vehicle will not be able to stop or such that it will exceed speed limits.

The arrangement further comprises a brake control unit 3, which is used to control the service brake and additional service brake functions, such as an automated brake system (ABS) or an electronic stability program (ESP).

The cruise control system is adapted to activate the auxiliary brake when the speed of the vehicle exceeds the set brake cruise speed. Due to the rolling resistance and the air drag of the vehicle, this situation will only occur when the vehicle is travelling downhill. When travelling along a horizontal road, the cruise control decreases the throttle before the brake cruise speed is reached. Preferably, all auxiliary brakes of the vehicle are engaged at the same time in order to increase the available brake power, but it is also possible to use only one auxiliary brake when the required brake power is relatively low.

In the inventive cruise control arrangement, the arrangement is adapted to activate the auxiliary brake when the speed of the vehicle exceeds the set brake cruise speed. Due to the response time of the auxiliary brake, a small delay will occur before the auxiliary brake delivers full brake power which will lead to a small overshoot in vehicle speed. An auxiliary brake may have a response, time of several seconds depending on the type of auxiliary brake. A hydraulic retarder normally have a relatively short response time, in the range of a few seconds, and an exhaust brake normally have a response time of up to 5 seconds or more, depending on the required brake power. The response time is measured from the activation of the auxiliary brake until the auxiliary brake is fully applied and delivers the requested brake power.

When the auxiliary brake delivers full brake power, it is determined if the vehicle speed exceeds the set brake cruise speed. If the vehicle speed exceeds the set brake cruise speed when the auxiliary brake delivers full brake power, it is determined that the brake power of the auxiliary brake is not sufficient to hold the vehicle speed at the set brake cruise speed. In this case, the service brake is applied in order to reduce the vehicle speed. The service brake is preferably applied relatively hard for a relatively short time interval, preferably less than 30 seconds, such that the vehicle speed is reduced without heating up the service brake too much. The vehicle speed is reduced to a predefined first speed, which is a speed that is lower than the set brake cruise speed. The predefined first speed may be a speed value that is equal to the set cruise speed or may be a speed value somewhere between the set cruise speed and the set brake cruise speed.

When the vehicle speed is equal to the predefined first speed, the service brake is released. The auxiliary brake is still delivering full brake power. The vehicle speed will now increase until it reaches the set brake cruise speed. If the brake power delivered by the auxiliary brake is sufficient to hold the vehicle speed at the set brake cruise speed, the vehicle will continue to travel downhill with the set brake cruise speed. This may be the case if the inclination of the downhill slope has changed during the brake operation.

However, if the inclination of the slope is the same, the brake power delivered by the auxiliary brake, which is delivering full brake power, will not be sufficient to hold the vehicle speed at the set brake cruise speed. The vehicle speed will increase and will again exceed the set brake cruise speed. The service brake is then applied again in order to reduce the vehicle speed to the predefined first speed. When the predefined first speed is reached, the service brake is released and the speed of the vehicle will increase again. If the mad conditions have changed, the brake power delivered by the auxiliary brake may be enough to hold the vehicle speed at the set brake cruise speed. If the vehicle speed exceeds the set brake cruise speed, the service brake is applied and the procedure is repeated.

The brake procedure is preferably repeated until a predetermined condition is reached. One predetermined condition may be the number of repetitions. It is possible to limit the number of repetitions to e.g. 5 times, in order to limit wear of the service brake. The number of repetitions can of course be selected freely, and can e.g. correspond to a number required for a relatively short downhill. When travelling down such a downhill, the preselected number of repetitions will allow the vehicle to travel the downhill without having to perform a downshift.

Another predetermined condition may be the remaining distance of the downhill. This requires that the vehicle control system is connected to a GPS navigation system having map access such that the topology of the road is known. In this case, it can be decided to let the vehicle travel downhill for e.g. 1 km before a downshift is performed.

Another predetermined condition may be the amount that the service brake has been used. The amount can be calculated in different ways, such as the total delivered brake power, the time that the service brake has been applied or be based on the actual temperature of the brake discs of the service brake.

Another predetermined condition may be the acceleration between the applications of the service brake, or the time interval between the applications of the service brake. The purpose of the invention is to be able to travel down a hill in a high speed interval without overusing the service brake. The service brake should thus have time to cool down between the applications of the service brake.

When a predetermined condition is reached, a downshift of the gearbox is preferably performed. By performing a downshift, the efficiency of the auxiliary brake arranged upstream of the gearbox will increase due to the higher rotational speed of the engine that will be the result of the downshift. By delaying a downshift, it is possible to improve fuel consumption and to avoid an unnecessary gear change.

If the predetermined condition is reached and it is decided to perform a downshift, the system controls the vehicle speed to a speed that allows a gear change. This speed is decided by the cruise control system and will be used as a new, intermediate brake cruise speed. It may be the predefined first speed, the set cruise speed or a lower speed. When the downshift has been performed, the auxiliary brake may be able to hold the vehicle speed at the intermediate brake cruise speed.

It is also possible that the auxiliary brake will not be able to, hold this new intermediate brake cruise speed. In this case, the service brake is applied when the vehicle speed exceeds the intermediate brake cruise speed and the speed is reduced to a lower, predetermined second speed value. The service brake is released when this speed is reached and the speed of the vehicle increases again to the intermediate brake cruise speed, when the service brake is applied again. Since the speed interval is now reduced the time interval between applications of the service brake will be increased such that the service brake will not overheat.

If the inclination of the slope that the vehicle travels down exceeds a predefined value, the cruise control arrangement may be adapted to apply the service brake of the vehicle before the vehicle reaches the set brake cruise speed. The inclination of the slope can either be measured when travelling down the slope or can be obtained from a map database. By applying the service brake before the vehicle reaches the set brake cruise speed, a smoother behaviour of the vehicle can be obtained in steep slopes and the wear of the service brake may decrease some. This can be seen as a temporary lowering of the set brake cruise speed, which is only used during this downhill travel.

Figure 2:
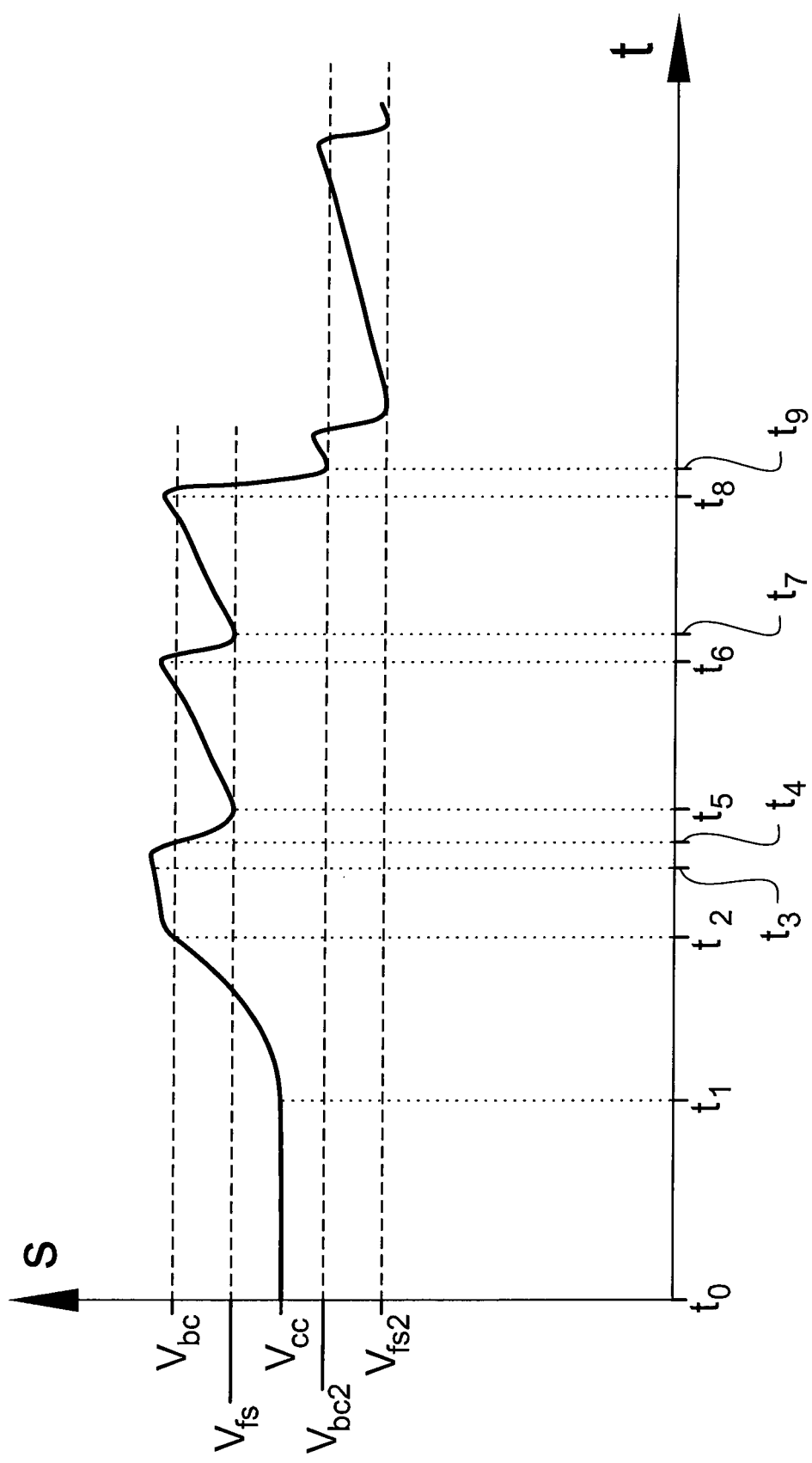
FIG. 2 shows a typical speed graph of a vehicle travelling down a constant downhill slope.

FIG. 2 shows an example of a vehicle speed profile of a vehicle travelling down a slope having a constant inclination. In the graph, s is speed, t is time, vbc is the set brake cruise speed, vcc is the set cruise speed and VfS is the predefined first speed.

At t0, the vehicle is travelling along a horizontal road at a constant set cruise speed. At ti, the downhill start. The vehicle will now accelerate such that the vehicle speed increases. At t2, the vehicle speed reaches the set brake cruise speed and the auxiliary brake is activated. Due to the response time of the auxiliary brake, the auxiliary brake is delivering full brake power at t3. The vehicle control system detects that the vehicle speed continues to increase, and applies the service brakes of the vehicle at t4. This reduces the vehicle speed until the vehicle speed is equal to the predefined first speed at t5, where the service brake is deactivated.

The vehicle speed increases again, until the vehicle speed exceeds the set brake cruise speed at t6, where the service brake is applied again. At t7, the vehicle speed equals the predefined first speed and the service brake is deactivated. At t8, the vehicle speed exceeds the set brake cruise speed again and the service brake is activated. At the same time, it is registered that a predetermined condition is reached, and that a downshift of the gearbox is required in order to be able to increase the interval between the applications of the service brake, i.e. to lower the use of the service brake to an acceptable value. In this case, the service brake will decrease the vehicle speed to a new, intermediate brake cruise speed vbC2 which will be used as a temporary new brake cruise speed value. This value is determined by the cruise control system based on different vehicle parameters and on the amount of use of the service brake. This lower speed is required in order to allow a gear change to a gear that will not overspeed the engine. At tg, the lower, intermediate brake cruise speed is reached and the downshift is performed. The vehicle speed increases and the service brake is applied in order to reduce the vehicle speed to a new temporary predefined second speed value VfS2—At this predefined second speed, the service brake is released. Since the speed interval of the vehicle is now lower, the acceleration of the vehicle will now be lower, which means that the time until the service brake must be applied is increased. In this way, the time interval between the applications of the service brake is increased and the wear of the service brake will be decreased.

Figure 3:
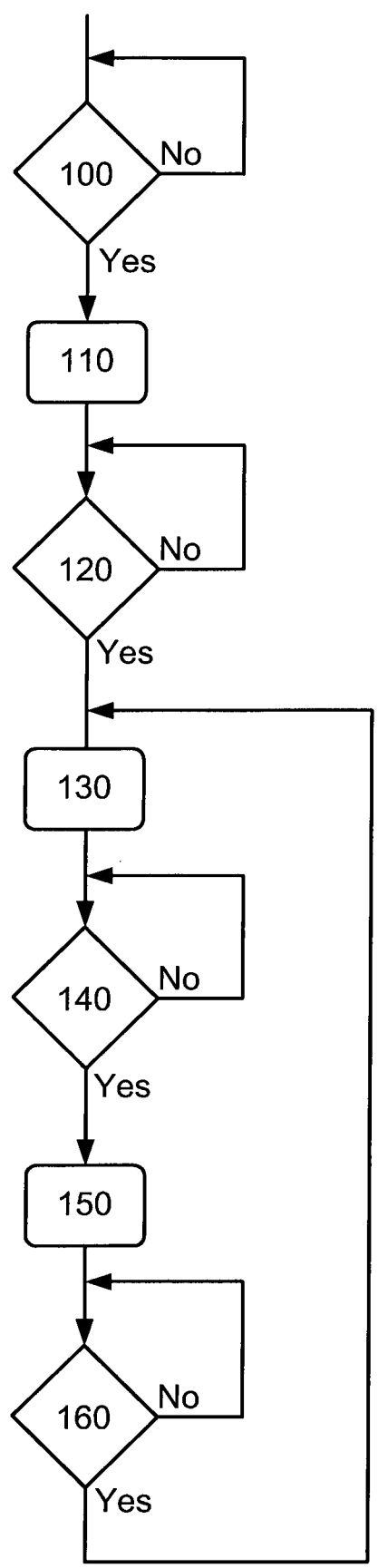
FIG. 3 shows a schematic flow chart of an inventive method for supporting a cruise control system of a vehicle.

FIG. 3 shows a schematic flow chart of a method for supporting a cruise control function in a vehicle according to the invention. The method is adapted to activate a service brake at the sane time as an auxiliary brake when the vehicle reaches a brake cruise speed, such that the service brake can compensate for the response time of the auxiliary brake.

In step 100, the cruise control function compares the actual vehicle speed with the set brake cruise speed. If the actual vehicle speed reaches the set brake cruise speed, an activation signal is sent to the control unit of the auxiliary brake and the control unit of the service brake in step 110. The auxiliary brake is activated, in step 120 and it is determined if the acceleration of the vehicle continuous. The auxiliary brake is activated by a preset amount which corresponds to a requested brake power, which in this case means that the auxiliary brake is fully applied. If the acceleration continuous, the service brake is activated in step 130. The service brake is activated such that the brake power of the service brake allows the speed of the vehicle to be reduced to a predetermined first speed.

In step 140, it is determined if the vehicle speed equals the predefined first speed. If the vehicle speed equals the predefined first speed, the service brake is deactivated in step 150. The speed of the vehicle will increase and in step 160, it is determined if the vehicle speed exceeds the set brake cruise speed. When the vehicle speed exceeds the set brake cruise speed, the service brake is applied in step 130, and the method is repeated until either the downhill slope decreases or ends, or until a predetermined condition is reached. If a predetermined condition is reached, a downshift of the gearbox is preferably performed, and the method can be repeated at a lower temporary set brake cruise speed.

The invention is not to be regarded as being limited to the embodiments described above, a number of additional variants and modifications being possible within the scope of the subsequent patent claims.

The invention claimed is:

1. A cruise control arrangement for a vehicle, where the cruise control arrangement is provided with a cruise control brake function and where the cruise control arrangement is provided with a set cruise speed value and a set brake cruise speed value, and where the cruise control brake function is active when the vehicle travels downhill,
wherein the cruise control arrangement is configured to
first, activate at least true auxiliary brake when the vehicle speed reaches the set brake cruise speed,
second, apply a service brake of the vehicle in order to reduce the speed of the vehicle to a predefined first speed if the vehicle speed exceeds the set brake cruise speed when the at least one, auxiliary brake is delivering full brake power, where the predefined first speed is lower than the set brake cruise speed,
third, deactivate the service brake when the speed of the vehicle is equal to the predefined first speed,
fourth, allow the vehicle speed to increase and to exceed the set brake cruise speed again, and
fifth apply the service brake again in order to reduce the vehicle speed to the predefined first speed,
wherein the cruise control arrangement is configured to provide the deactivation of the service brake while controlling the auxiliary brake to continue delivering full brake power.

2. The arrangement according to claim 1, wherein the cruise control arrangement is further adapted to repeat deactivating the service brake when the speed of the vehicle is equal to the predefined first speed while controlling the auxiliary brake to continue delivering full brake power, allowing the vehicle speed to increase and to exceed the set brake cruise speed again, and then applying the service brake again in order to reduce the vehicle speed to the predefined first speed, to thereby repeatedly apply the service brake of the vehicle to reduce the speed of the vehicle to the predefined first speed if the vehicle speed exceeds the set brake cruise speed value when the at least one auxiliary brake is delivering full brake power.

3. The arrangement according to claim 2, wherein the cruise control arrangement is adapted to repeat the application of the service brake until a predetermined condition is reached.

4. The arrangement according to claim 1, wherein the predefined first speed is equal to the set cruise speed.

5. The arrangement according to claim 1, wherein the predefined first speed is higher than the set cruise speed.

6. The arrangement according to claim 1, wherein the cruise control arrangement is further adapted to apply the service brake of the vehicle before the vehicle reaches the set brake cruise speed if the vehicle is travelling down a slope having an inclination exceeding a predefined value.

7. The arrangement according to claim 3, wherein the cruise control arrangement is adapted to perform a down shift of a gear-box when the predetermined condition is reached.

8. The arrangement according to claim 7, wherein the cruise control arrangement is adapted to control the vehicle speed to a speed that allows the downshift of the gear-box.

9. The arrangement according to claim 8, wherein the cruise control arrangement is adapted to use the speed that allows the downshift of the gear-box as a new, intermediate brake cruise speed.

10. The arrangement according to claim 3, wherein the predetermined condition is a predetermined number of repetitions.

11. The arrangement according to claim 3, wherein the predetermined condition is the time interval between two applications of the service brake.

12. The arrangement according to, claim 3, wherein the predetermined condition is dependent on the amount that the service brakes has been used.

13. The arrangement according to claim 1, wherein the at least one auxiliary brake is a compression brake, a hydraulic or electric retarder brake or an electric machine.

14. Vehicle comprising an arrangement according to claim 1.

15. A method for controlling braking of a vehicle having a brake cruise control function when the vehicle is travelling downhill and when the brake cruise control function is active, where the cruise control brake function is provided with a set cruise speed and a set brake cruise speed, the method comprising:
first, activating at least one auxiliary brake when the vehicle speed reaches the set brake cruise speed,
second, determining if the at least one auxiliary brake is delivering full brake power,
third, determining if the vehicle speed exceeds the set brake cruise speed when the at least one auxiliary brake is delivering hill brake power,
fourth, applying a service brake of the vehicle to reduce the speed of the vehicle to a predefined first speed if the vehicle speed exceeds the set brake cruise speed when the at least one auxiliary brake is delivering full brake power, where the predefined first speed is lower than the set brake cruise speed,
fifth, deactivating the service brake when the speed of the vehicle is equal to the predefined first speed,
sixth, allowing the vehicle speed to increase and to exceed the set brake cruise speed again, and
seventh, applying the service brake again in order to reduce the vehicle speed to the predefined first speed,
wherein the deactivation of the service brake is performed while controlling the auxiliary brake to continue delivering full brake power.

16. The method according to claim 15, where the steps of deactivating the service brake when the speed of the vehicle is equal to the predefined first speed while controlling the auxiliary brake to continue delivering full brake power allowing the vehicle speed to increase and to exceed the set brake cruise speed again, and then applying the service brake again in order to reduce the vehicle speed to the predefined first speed are repeated until a predetermined condition is reached.

17. The method according to claim 16, where the predetermined condition is a predetermined number of repetitions.

18. The method according to claim 16, where the predetermined condition is the time interval between two applications of the service brake.

19. The method according to claim 16, where the predetermined condition is dependent on the amount that the service brake has been used.

20. The method according to claim 16, where a down shift of a gear-box is performed when the predetermined condition is reached.

21. The method according to claim 20, comprising controlling the vehicle speed to a speed that allows the downshift of the gear-box.

22. The method according to claim 21, comprising using the speed that allows the downshift of the gear-box as a new, intermediate brake cruise speed.

23. The method according to claim 15, where the predefined first speed is equal to the set cruise speed.

24. The method according to claim 15, where the predefined first speed is higher than the set cruise speed.

25. A computer comprising a computer program for performing all the steps of claim 15 when the program is run on the computer.

26. A non-transitory computer pr gram product comprising a computer program stored on a non-transitory computer readable medium for performing all the steps of claim 15 when program product is run on a computer.

* * * * *